(12) United States Patent
Sanders et al.

(10) Patent No.: US 11,943,427 B2
(45) Date of Patent: Mar. 26, 2024

(54) DISPLAY MODIFICATION SYSTEM AND METHOD

(71) Applicant: Sony Interactive Entertainment Inc., Tokyo (JP)

(72) Inventors: Matthew William Sanders, London (GB); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/873,486

(22) Filed: Jul. 26, 2022

(65) Prior Publication Data
US 2023/0033245 A1 Feb. 2, 2023

(30) Foreign Application Priority Data

Jul. 30, 2021 (GB) ..................................... 2110988

(51) Int. Cl.
*H04N 17/00* (2006.01)
*G06V 20/50* (2022.01)
(Continued)

(52) U.S. Cl.
CPC ........... *H04N 17/004* (2013.01); *G06V 20/50* (2022.01); *G09G 3/006* (2013.01); *G09G 3/20* (2013.01);
(Continued)

(58) Field of Classification Search
CPC ...... H04N 17/004; G06V 20/50; G09G 3/006; G09G 3/20; G09G 2320/06; G09G 2320/0693
See application file for complete search history.

(56) References Cited

U.S. PATENT DOCUMENTS

2009/0122132 A1 5/2009 Thielman
2011/0157409 A1* 6/2011 Adachi ................... G09G 5/00
348/222.1
(Continued)

FOREIGN PATENT DOCUMENTS

KR 1020180042030 A 4/2018

OTHER PUBLICATIONS

Extended European Search Report for corresponding EP Application No. 22184504.3, 13 pages, dated Dec. 15, 2022.
(Continued)

*Primary Examiner* — Gerald Johnson
(74) *Attorney, Agent, or Firm* — Matthew B. Dernier, Esq.

(57) ABSTRACT

A display modification system for use with a display device, including a camera operable to capture images of at least a portion of the display device, an image analysis unit operable to derive the value of one or more parameters associated with the display of images by the display device in dependence upon the captured images, a modification determination unit operable to determine a modification to be applied to a content display process associated with the display device, where the modification includes changes to a content rendering process for generating content to be displayed by the display device and/or one or more display settings associated with the display device, and a modification communication unit operable to transmit information identifying the determined modification to one or both of the display device and a processing device operable to render content for display by the display device.

13 Claims, 5 Drawing Sheets

(51) Int. Cl.
G09G 3/00 (2006.01)
G09G 3/20 (2006.01)
(52) U.S. Cl.
CPC . G09G 2320/06 (2013.01); G09G 2320/0693 (2013.01)

(56) References Cited

U.S. PATENT DOCUMENTS

| | | |
|---|---|---|
| 2012/0127324 A1 | 5/2012 | Dickins |
| 2013/0050504 A1 | 2/2013 | Safaee-Rad |
| 2019/0041642 A1* | 2/2019 | Haddick ................. G06F 1/163 |
| 2019/0052872 A1 | 2/2019 | Shyshkin |
| 2019/0228737 A1 | 7/2019 | Lin |
| 2019/0373206 A1 | 12/2019 | Kang |
| 2020/0035195 A1 | 1/2020 | Maeng |
| 2020/0043201 A1* | 2/2020 | Tanaka ................. G06T 19/006 |
| 2021/0082373 A1 | 3/2021 | Lou |
| 2022/0130297 A1* | 4/2022 | Vlachos ............... G09G 3/3607 |

OTHER PUBLICATIONS

Combined Search and Examination Report for corresponding GB Application No. GB2110988.9, 10 pages, dated Jan. 27, 2022.

* cited by examiner

DISPLAY MODIFICATION SYSTEM AND METHOD

BACKGROUND OF THE INVENTION

Field of the Invention

This disclosure relates to a display modification system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is considered that in many different applications it is advantageous to provide an optimal, or at least a sufficiently high quality, display of image content—this includes applications such as movies, video gaming, video conferencing, and the use of different display devices such as televisions, mobile phones, and head-mountable display devices (HMDs). Much of the focus in this area has been on the increasing of frame rates for rendered content (such as the shift from thirty frames per second to sixty or one hundred and twenty frames per second in more recent games consoles), or increasing the level of detail within a rendered image.

However, these are content-oriented modifications that do not take into account a number of parameters associated with a specific reproduction arrangement—for instance, the capabilities of a display device. The capabilities of display devices can vary significantly between different models; and given the large range of models that are available to or used by consumers this means that there is little consistency between these capabilities. For example, displays may have display technology (for instance, LCD or LED), different resolutions, dynamic ranges, refresh rates, and backlights. In addition to this, these capabilities can vary between display devices of the same model—this can be due to aging of the device, imperfections in the hardware, or inconsistencies in the manufacturing process, for example.

While users are sometimes able to modify the display of content manually, for example by varying an in-game brightness, this can often be cumbersome and still not provide an optimal viewing experience. This is because users are often uninformed as to what display settings will result in the best appearance for the displayed content, as well as being limited in which changes they can make.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
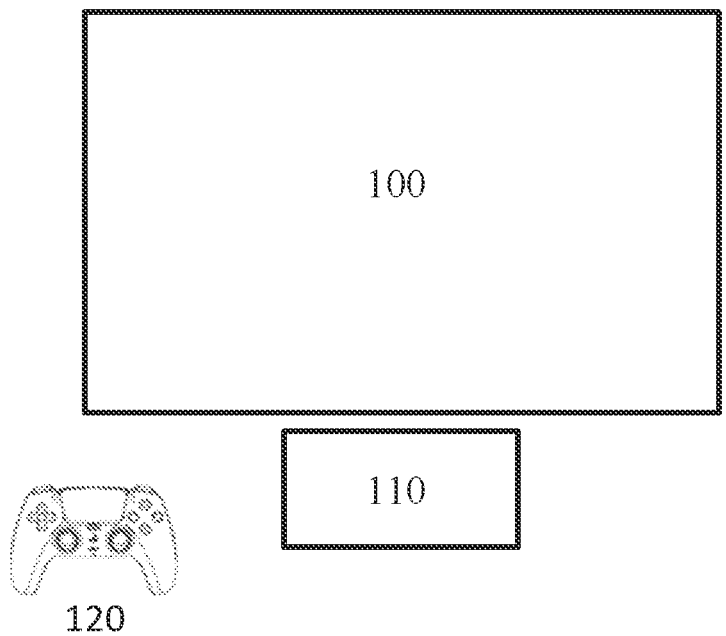
FIG. 1 schematically illustrates a processing and display arrangement.

Referring now to the drawings, wherein like reference numerals designate identical or corresponding parts throughout the several views, embodiments of the present disclosure are described.

FIG. 1 schematically illustrates an arrangement in which embodiments of the present disclosure may be implemented. This arrangement includes a display 100, a processing device 110, and a controller 120 associated with (such as being able to communicate with) the processing device 110. The display 100 may be a television, for example, or any other suitable display—examples include computer monitors, laptop screens, mobile phone or tablet displays, portable games console displays, and HMDs. The processing device 110 may be any suitable device for performing processing tasks and providing images for display to the display 100. Examples of processing devices include computers, games consoles, mobile phones, and tablets. The controller 120 represents the provision of a control device to the user for controlling the operation of the processing device 110; for instance to begin the playback of content on the display 100. While shown as separate units in this Figure, it is considered that embodiments of the present disclosure may also be implemented in conjunction with an integrated device (such as a mobile phone, portable games console, or laptop) that comprises each of a display, a processor, and a user input element.

Embodiments of the present disclosure are provided so as to enable the enhancement of the display quality of images to a viewer. The display quality may be measured in a number of different ways, with the parameters by which the display quality is measured being able to be selected by the skilled person freely. For instance, in some cases the skilled person may define the display quality in dependence upon the type of display device or the type of content being displayed. In some configurations, it is considered that the viewer may be able to define (or select) suitable parameters based on their own preference.

For example, when the displayed content is a first-person shooter game it may be considered that the most significant parameters are the frame rate and the response time of the display. An improved display quality in such an example would be identified by modifications that improve the frame rate and/or response time of the display or otherwise mitigate the impact of those parameters upon the content display. However, when the displayed content is a movie it may instead be considered that the colour range and contrast have a higher importance and therefore an improved display quality would be identified by improving these aspects of the display.

Similarly, different display types may be associated with different indicators of improved display quality. For instance, a computer monitor that is intended for gaming (a monitor that is selected for its low response time, for example) may be associated with indicators that relate to the response time and/or frame rate. Meanwhile, a mobile phone display (which is more likely to be used in bright environments, such as outside in direct sunlight) may be instead associated with indicators relating to brightness and/or contrast.

Each of the examples of assessing display quality that are described above provides an insight into factors that may be considered when determining an objective display quality for a given display and/or content to be displayed. The skilled person, in being able to identify desirable characteristics of a display for a particular use, is able to determine an objective display quality for a particular arrangement rather than being limited only to the examples provided in the present disclosure.

Figure 2:
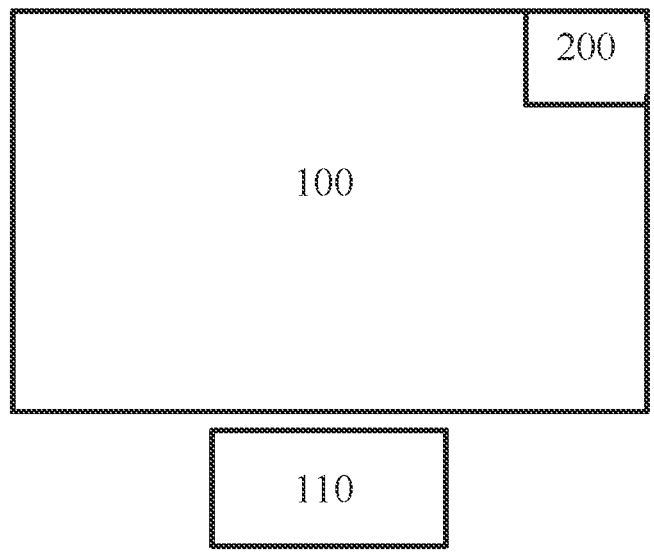
FIG. 2 schematically illustrates a display and camera arrangement.

In order to determine a display quality, embodiments of the present disclosure provide an arrangement in which a camera is configured to capture images of the display for the purpose of determining one or more parameters of the display and/or the displayed image. FIG. 2 schematically illustrates an embodiment of the present disclosure.

In FIG. 2, the display 100 is provided in association with a camera 200 that is arranged so as to capture images of at least a portion of the display area of the display 100. The size of the camera 200 is chosen to be large in the image, occupying approximately one sixteenth of the display 100, for the sake of clarity within the image. The actual size of the camera 200, and the portion of the display 100 that it images, can be selected freely; in some embodiments a smaller camera 200 may be desired to reduce the visual impact of the camera 200 when not in use. Alternatively, a larger camera 200 may be provided that is operable to capture an image of a larger area of the display 100 so as to increase the sample size and thereby increase the likelihood that the imaged area may be considered to be representative of the display 100 as a whole.

The camera 200 is shown at the top right corner of the display 100, although it is considered that any suitable part of the display 100 may be imaged—although corners or edges of the display 100 may be preferable as it may be easier to arrange the camera 200 here. The camera 200 may be affixed to the display 100 in any suitable fashion; examples include a clamp that grips a portion of the display 100, a hook that hangs over the top of the display 100, a sleeve that slips over the corner of the display 100, a temporary (or permanent) adhesive, and/or a magnet-based mounting arrangement. In some embodiments the display 100 may have such a camera provided in an integrated fashion so as to monitor the display quality throughout the lifetime of the device and/or during the display of different types of content. Of course, in some embodiments the camera 200 may be neither affixed to nor integrated with the display 100 and instead is placed near to the display (such as on a table) or held by a user for the duration of the image capture process.

The distance between the camera 200 and the display 100 may be determined based upon a focal distance of the camera 100, so as to ensure that the captured images are in focus, as well as the amount of the display 100 that is intended to be imaged. For instance, a larger display may be associated with a camera position that is further from the display so as to capture a larger area in an image—this is to ensure that at least a threshold amount of the display is imaged, so as to enable the imaged area to be considered to be representative of the entire display.

In some embodiments, the camera 200 may be located above or to the side of the display 100 so as to avoid obscuring the view of a viewer of the display. In such embodiments the camera 200 may be angled as appropriate for capturing an image of the display 100, with one or more mirrors or other optical elements being provided where appropriate to assist with this.

Figure 3:
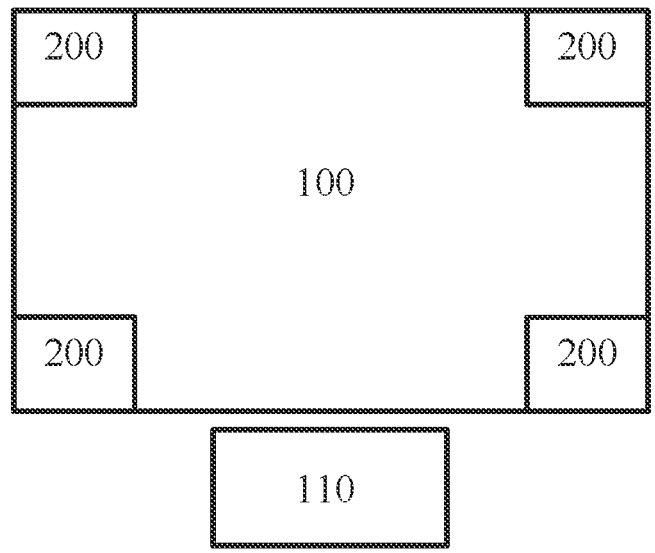
FIG. 3 schematically illustrates a display and camera arrangement comprising multiple cameras.

In a number of embodiments it may be considered advantageous to provide a number of cameras 200, as is shown in FIG. 3. In this Figure, four cameras 200 are located in respective corners of the display 100; this array of cameras can be provided to enable the imaging of multiple areas of the display 100 to determine whether the display quality is the same in a number of different areas. Similarly, the use of additional cameras can enable a less obtrusive arrangement to be provided by virtue of using smaller cameras (as the number of smaller cameras can be provided to provide a comparable imaged area to that of the camera in FIG. 2, for example), or to enable a larger (and therefore more representative) display area to be imaged.

In some cases in which multiple cameras are provided, each of the cameras may have different properties so as to enable an improved measurement of the properties of a display and the manner in which the content is displayed. For instance, different cameras may be provided that have different sensors, enabling more information about display colours and/or contrast to be obtained if each is operable to capture images of different colour spaces (including the use of black and white cameras). Similarly, the cameras may be provided with different shutter speeds and/or types to assist with characterising the refresh rate of the display. It is further noted that the areas imaged by each of the cameras (whether identical or not) may overlap where considered to be appropriate.

While the above discussion considers that the camera should be located in close proximity to the display, this is not considered to be an essential feature. While it may be required that a higher-quality camera may be required in embodiments in which the camera is located further from the display, this may be preferable as it can allow a greater freedom in the imaging process and/or a less intrusive imaging arrangement. Higher-quality here can, for example, mean that the camera captures images with a higher resolution, or that the camera is provided with a more complex lens arrangement to provide a zoom function to enable a suitably detailed image to be captured. A camera that is located further away may be mounted upon another surface, for example, or may be integrated with another device and/or held by a user.

Figure 4:
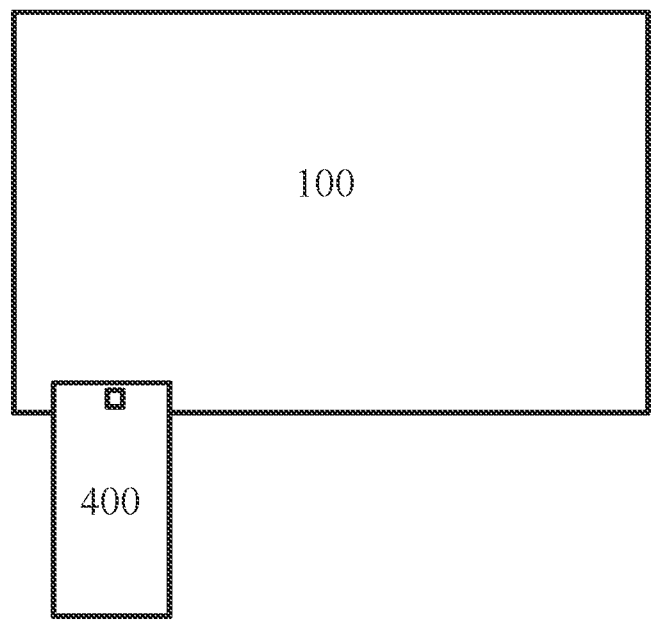
FIG. 4 schematically illustrates an arrangement comprising a display device and a camera device.

FIG. 4 schematically illustrates an example of an arrangement in which a camera is used that is not located in close proximity to the display. In this embodiment, the camera is formed as part of a mobile phone 400 (an example of a handheld device comprising a camera), which may be a particularly suitable example of a camera due to the fact that such devices are generally already available to a user. As a part of the image capture process, the user may be provided with instructions on how to locate and/or move the device 400 so as to capture useful images of the display 100. For instance, a user may be instructed to hold the device 400 at a particular distance from the display 100, and/or to orientate the device 400 in such a way so as to image a particular area of the display 100.

Further configurations of the respective devices discussed above are envisaged as a part of the present disclosure, but are not explicitly recited. However, upon consideration of the present disclosure it would be apparent to the skilled person that embodiments of the present disclosure can include any arrangement of display device and processing unit that includes a camera arranged to capture images of the display.

Figure 5:
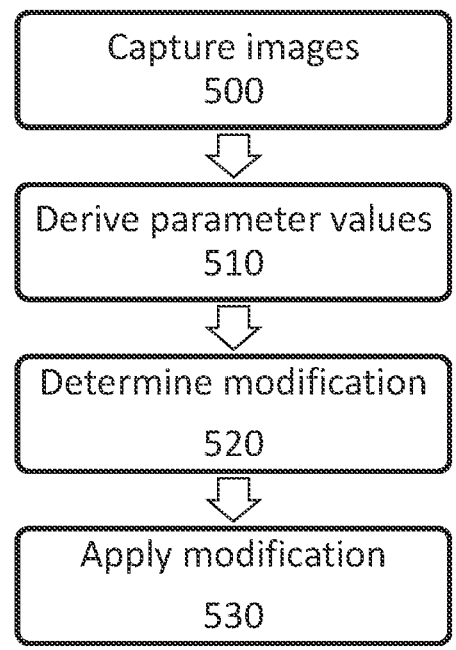
FIG. 5 schematically illustrates a display modification method.

FIG. 5 schematically illustrates a display modification method for use with a display device according to one or more embodiments of the present disclosure. Such a method is used to capture information about how content is displayed by a display device, and then to modify the content display in response to a characterisation of this captured information. This modification can be implemented by changing display settings of the display device (such as changing a display brightness or an operation mode), changing a rendering process for generating content (for example, rendering content using a different colour palette or at a different frame rate), or a combination of the two. Embodiments of this disclosure according to the method of claim 5 can be used to compensate for a poor quality display device, and/or to improve the utilisation of the features of a high quality display.

A step 500 comprises capturing images of at least a portion of the display device using a camera. In some embodiments, it may be sufficient to image a small portion of the display area of the display device (such as one percent of the display area) while in others it may be desirable (or necessary) to capture a larger portion of the display area (such as five, ten, twenty or fifty percent). In some cases it may be preferred that a calibration step is performed in which the entire display area is imaged, to ensure that the display of content is uniform across the display area. The portion of the display area that is imaged need not be contiguous, as is apparent from the discussion regarding FIG. 3, and the duration of the image capture (measuring in time or a number of frames) may be selected freely. Each of the image capture parameters (such as portion imaged and the image capture period) can be selected freely by the skilled person so as to obtain the desired information for the display modification processing.

A step 510 comprises deriving the value of one or more parameters associated with the display of images by the display device. This step can comprise the use of image processing techniques so as to determine one or more parameters of the display area that is imaged. Examples of such parameters include a refresh rate of the display, a display time for respective frames, displayed colours, contrast values, brightness values, dynamic range, and any variations in these parameters across the imaged display area. In some cases, an identification of the camera and one or more environmental conditions (such as brightness of the environment) may be considered so as to enable a more accurate determination of these parameters.

A step 520 comprises determining a modification to be applied to a content display process associated with the display device, wherein the modification comprises changes to a content rendering process for generating content to be displayed by the display device and/or one or more display settings associated with the display device. The modification is determined so as to increase the quality of the image display by the display device; as noted above, an objective measure of the display quality can be determined by selecting one or more metrics (that is, specific parameters) that correspond to improved display quality for a given application (that is, in dependence upon one or both of the content being displayed and the type of display).

For instance, if it is determined that the displayed image is too bright (that is, the captured image indicates a higher than expected or desirable brightness) then a modification may be determined that alters this assessment. In other words, a modification can be identified that reduces the brightness of the displayed image. In some embodiments this may be achieved by adjusting the settings of the display device itself so as to lower the brightness (for example, by dimming a backlight of an LCD screen); alternatively, or in addition, a processing device that provides the images to the display may be controlled to reduce the brightness of the rendered images.

A step 530 comprises applying the determined modification; that is, applying the modification that is determined in step 520. As noted above in the discussion of step 520, this can include the control of a display device and/or processing device as appropriate for the determined modification.

Such a process may be performed iteratively to arrive at a desired display quality; for instance, once the determined modification has been applied in step 530, processing can return to step 500 so as to capture images of the modified display of content. The process of this method can then be repeated using the updated images with additional modifications being determined to further modify the display process (if it is determined that any further modifications are desirable, otherwise this step may be omitted). The process can be performed iteratively even in cases in which no modification is determined to be applied—it is not required that the process is terminated when a desired display quality is obtained, as the display may change over time (for example, due to heating effects or changes in external lighting) and the content being displayed may also vary over time.

In some embodiments, the method of FIG. 5 is implemented during the playback of content (for example, during the viewing of a movie or during gameplay). This may be advantageous in that the captured images directly correspond to the intended use of the display, and therefore the modifications to be applied may be determined in a more personalised (that is, to the content and display combination) manner than with the use of specific calibration imagery. In such embodiments, it may be useful to identify characteristics of the rendered images themselves for comparison to the analysis of the displayed image so as to ascertain an appropriate modification to be applied.

Alternatively, or in addition, specific calibration imagery may be defined so as to standardise the display modification process. This calibration imagery may be selected for its usefulness in identifying parameters relating to display quality; for instance, the calibration imagery may comprise an image with an array of colours that represent a significant range of the displayable spectrum—this can enable an effective determination of parameters relating to the display of colours by the display device. It is further considered that separate sets of calibration imagery may be provided for different types of display or different types of content, so as to provide a more specific calibration process. For example, a different set of calibration imagery may be provided for HDR (high dynamic range) displays than for SDR (standard dynamic range) displays to reflect the fact that they have different display capabilities. Similarly, content having different display requirements may also be associated with different calibration imagery—for instance, a football game may be associated with a different set of calibration imagery to a horror game in view of their different expected colour palettes and brightness (for example).

As discussed above with respect to step 510 of FIG. 5, the values of one or more parameters are to be derived from images captured of the display. These parameters may represent any suitable characteristics of the displayed imagery; examples include:

Subpixel rendering support by a display device;
The colour range (gamut) supported by the display device;
Colour temperature;
The dynamic range of the display device;
The sharpness of the displayed images;
The brightness associated with the backlight of a display (including any variations of this brightness where appropriate);
The gamma brightness of the display device;
The contrast of the display device;
The response time of the display device;
The refresh rate of the display device; and
The consistency of these parameters (where appropriate) for different areas of the display.

Each of these parameters can be identified from consideration of one or more captured images as appropriate; this information may (such as contrast) be able to be derived from the image alone, while in some cases (such as a refresh rate) may require the use of information about timing of the images or other information that is not within the image. In any case, the skilled person is able to identify an appropriate image (or other) characteristic to use for the determination of values of these parameters. In some cases, image processing may be performed on the images in order to assist with evaluating parameters; for example, an edge detection process may assist with identifying edges in the content for the determination of image sharpness.

In some embodiments an initial estimation of these parameters may be generated based upon an identification of the display device (or the device comprising the display, in integrated device embodiments). Such an identification can be provided by a user via inputs or by analysis of data output by a display device (such as Extended Display Identification Data, EDID, that can be transmitted via HDMI), for example. As noted above however, this initial information should be considered a guideline only in many cases as the performance of a display can vary with age and due to imperfections in the manufacturing process and the like—and as such devices with equivalent model numbers or identical EDID may have differences in their operation. In view of this, the method of FIG. 5 should still be performed even if such data is available.

In some embodiments, a preferred value of one or more parameters is provided for a particular display device and/or content that is used. In such cases, the modification that is determined is a modification that causes the measured parameters to converge towards those preferred values. For instance, if a particular brightness value is desired, then the brightness value of the display can be varied until the captured images of the display area indicate that the desired value is reached. In this way, the display quality is considered to have been improved when parameters are closer to the desired values—these may be desired values that are determined by the display manufacturer, content creator, or the user (for example).

It is considered that some of the parameters (such as the dynamic range of the display device) are not parameters that can be adapted. Modifications in response to the determination of these parameters are therefore made so as to compensate for (or take advantage of) particular values. For instance, if it is determined that the display has a smaller dynamic range than would be preferred for the display content then the rendering of the content can be adjusted so as to use a smaller dynamic range. This can improve the image quality in that either compatibility is improved or in that the displayed images have fewer errors (such as incorrect colours being displayed). Similarly, features such as response time compensation (which compensates for a slow response time of a display) can be implemented which compensate for a particular parameter value without necessarily changing the parameter.

In some embodiments, it may be advantageous to employ a trained machine learning model to determine appropriate modifications to be applied. Such a model can be trained so as to receive an input comprising values for one or more parameters associated with the content display, and to output one or more modifications so as to modify those parameters (or to compensate for them). A number of different training methods for such a model may be considered appropriate; the examples discussed in the present disclosure should not be regarded as being limiting.

In a first example, a reinforcement learning approach may be adopted. The training process in this case may comprise an agent being provided with an initial image (either an actual captured image from a display, or an image that purports to be a captured image). The agent is then able to apply changes to the initial image with the goal of increasing the display quality of the image. The success of the agent is measured by the similarity between the image modified by the agent and a known image that represents a version of the initial image having an improved display quality. The reward supplied to the agent can be selected in dependence upon a similarity between these images; this similarity can be determined in dependence upon an overall impression to a viewer (as estimated using an image comparison process), or by comparing the values of the parameters that have been modified to those corresponding to the target image (if known). In some embodiments, the image generated by the reinforcement learning agent may be displayed on a display device such that a camera can capture the displayed image and compare this to the target image.

A second example is that in which a generative adversarial network (GAN) is used. In this example, the generator is trained to generate images having a high display quality while the discriminator is trained to discriminate between these generated images and a target image that represents a displayed image having a high display quality. It may be considered advantageous that an initial image is provided to the generator (rather than a random input as may sometimes be preferred) to form the basis of this process—this is because the goal is to determine appropriate modifications, rather than to generate high-quality images from nothing. In some embodiments the image that is input to the discriminator is one captured by a camera of the generated image being displayed by a display device.

In some approaches, a machine learning model may be provided that is trained based upon the parameters alone and not involve the use of any images. These parameters can be selected from any suitable rendering parameters and/or display parameters associated with the display device. In some arrangements this could be implemented alongside an actual display of content using modified/generated (by the machine learning model being trained) parameters as a part of the training process, with the displayed content being analysed so as to determine an image quality (and therefore a reward to be provided to a reinforcement learning agent, for instance). Alternatively, or in addition, a prediction or simulation of the appearance of images displayed using the modified/generated parameters can be performed based on predefined information describing a display. The predicted or simulated image appearance can then be used to generate feedback to the machine learning model in accordance with whichever training approach is selected.

Once the modification has been determined, it can be implemented in a manner that is suitable for that particular modification. In some embodiments, the modification can be a change to a rendering parameter—this can be implemented at a software level (such as providing an input to a game that modifies the rendering process), or at a system level (such as providing an input to a processing device, such as a games console, that causes the rendering process to be modified). Alternatively, or in addition, the modifications may be implemented in a processing step that alters the rendered images that are generated—for example, a processing step may be performed that has rendered images for output as the input, and modifies those rendered images before they are provided to a display device. Of course, such a process could also be implemented at the display device rather than the rendering device where appropriate.

In some embodiments modifications may be determined that are instead to be applied to the display device rather than the content itself. In such a case, communication with the display device by the processing device that determines the modification (or an intermediate device, such as a communications device) may be performed. For instance, many televisions are equipped with Bluetooth® or Wi-Fi® connections that could be reconfigured to enable communication with a device for the purpose of receiving information about modifications to be implemented by the display device. Of course, other wireless or wired communication protocols could be utilised to transfer this information where appropriate. Examples of such modifications include changing a display mode and modifying parameters such as brightness or contrast. Here, display mode refers to features such as 'game mode', 'movie mode', 'sports mode', motion smoothing, edge enhancement, or any other preset mode that may be provided by a display device to enable a modification of the display through processing and/or display setting adjustment.

The modifications that are determined can be considered to have a validity period or conditions upon the validity, in some embodiments. For instance, in some cases it may be considered appropriate to perform a calibration process (or another process to determine if modifications are appropriate) upon each initialisation of a rendering and/or display device, upon each use of a rendering device with a new display device, after a predetermined time period (such as a day, week, month, or year) has elapsed since the previous process, or in response to external conditions (such as a measured change in brightness of the environment in which the display is provided, for instance measured by a light sensor or camera associated with the display and/or rendering devices).

Upon expiry of a validity period (or satisfaction of an invalidity condition/failure to meet a validity condition), the display parameters may revert to default values or may adopt estimated values in dependence upon general information about the rendering and display system. For instance, if no up-to-date information about modifications is available for a system it may be considered appropriate to consult a centralised database or a look-up table that indicates appropriate modifications for a system based upon available information (such as model numbers and/or basic parameters such whether a display is HDR or SDR). This can enable an improved display of content to be provided even if specific information about a system has not been captured (or at least not captured recently). Alternatively, rendering of content may be suspended until a new calibration process for determining parameters has been performed.

In some embodiments the modifications that are determined can be used to generate a profile for a combination of a display device and a rendering device (or indeed, each device separately where considered appropriate). This can enable the modifications to be recalled on demand, which can preclude the need for determining the modifications anew in some cases. This may be particularly useful in the case that a rendering device is a portable device (such as a mobile games console) that may be frequently used with different display devices — by storing this data, the frequency with which the modifications are to be determined can be reduced. These profiles may include more than one set of parameters for modifying the rendering and/or display process for each rendering device and display device combination; for instance, content-specific and/or time-specific profiles may also be provided that can provide increased adaptability for the modification arrangement.

Figure 6:
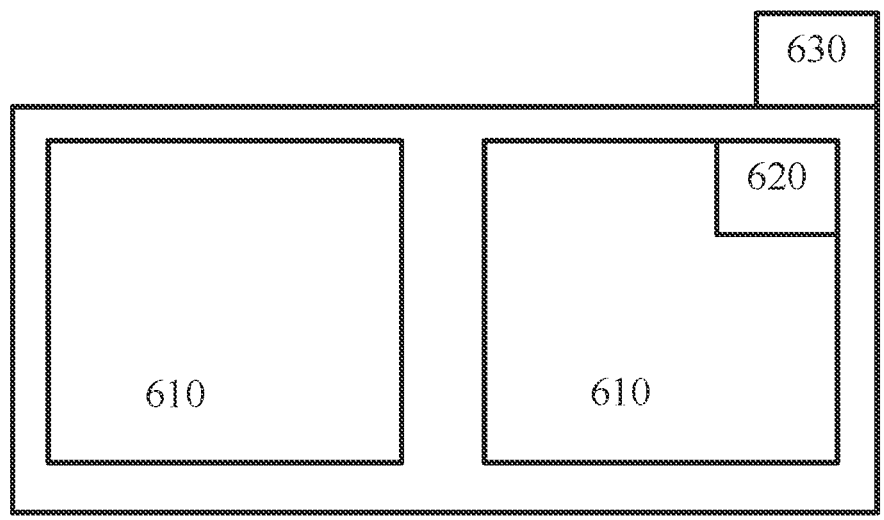
FIG. 6 schematically illustrates an HMD according to one or more embodiments of the present disclosure.

FIG. 6 schematically illustrates an exemplary embodiment in which the display is not a television, but instead an HMD. While a number of the embodiments described above are suitable for use with an HMD, the following discussion relates to an embodiment which may have particular benefits in the context of an HMD. Of course, that is not to say that the benefits are limited to such an embodiment; in many cases other display arrangements (such as mobile phones, handheld games consoles, and televisions) may also benefit from such features.

The HMD 600 is provided with a pair of displays 610 that are configured to display content to a viewer. While the HMD 600 is shown as a full-immersion HMD, it is considered that the present discussion is equally applicable to augmented reality arrangements. The HMD 600 is further provided with at least one camera 620 operable to capture images of at least a portion of one or both of the displays 610; in many cases, it can be considered that the displays 610 are similar enough that only a portion of one need be imaged by a camera 620. The HMD 600 is also equipped with a further camera 630 (which in some cases may be a stereoscopic camera, or a pair of cameras may be provided) that is operable to capture images of the environment, and to provide these for display by the displays 610. While shown as being a part of the HMD 600, the camera 630 can also be provided separately (for example, as a part of another device such as a mobile phone or portable games console)—this is also considered to be the case when implementing corresponding arrangements in non-HMD contexts.

The images captured by the camera 630 are displayed by the displays 610, with images being captured of this display by the camera 620. The images captured by the camera 620 can then be used as the basis for determining modifications to be made to the display of content, with the images captured by the camera 630 being used as reference or calibration images. In other words, differences between the images captured by the cameras 620 and 630 can be used to derive one or more parameters of the displays 610 that can be modified. Such a feature may have particular relevance in HMD-based arrangements as it may be common for these devices to provide a see-through view—and therefore a user will be more sensitive to the display parameters (as they are well-acquainted with the appearance of the environment) than they would otherwise be.

As noted above, such an arrangement may also be utilised in non-HMD arrangements. This can be used to identify parameters that enable a display of content that is more precisely tailored to the environment in which the display is present. For instance, brightness matching to the environment may be simplified by comparing the captured images of the environment and the captured images of the images of the environment as displayed. Alternatively, a comparable technical arrangement could be implemented such that the images captured by the camera 630 are not displayed—but are instead analysed to identify one or more parameters associated with the environment so as to further enhance the display modification process. For instance, an ambient brightness of the environment may be determined so as to assist in characterising properties of a desired content display.

Figure 7:
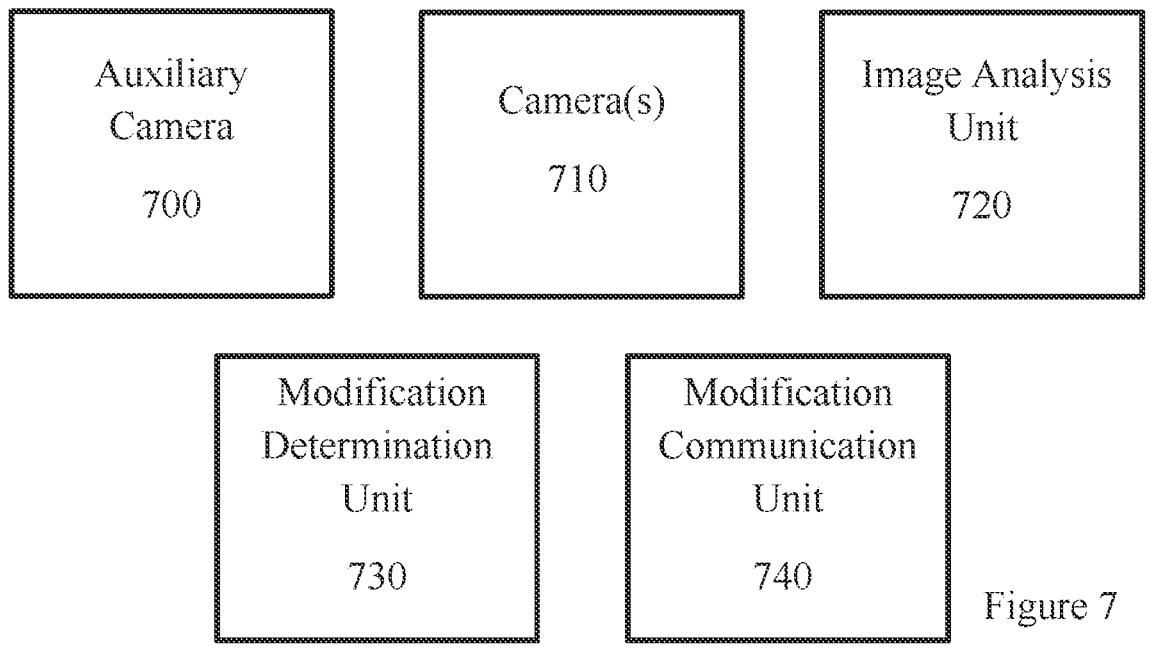
FIG. 7 schematically illustrates a display modification system.

FIG. 7 schematically illustrates a display modification system for use with a display device. The system comprises an optional auxiliary camera 700, one or more cameras 710, an image analysis unit 720, a modification determination unit 730, and a modification communication unit 740. While the specific configuration of these elements can be freely determined by the skilled person, it is considered that in a number of embodiments, at least the units 720, 730, and 740 may be implemented by a processor located in a games console (portable or otherwise), a mobile phone, a dedicated modification determination device, a computer, a display device (such as a television), or a server. It is further considered that the functionality of these units may be distributed amongst a plurality of devices as appropriate; for example the image analysis unit 720 may be implemented in an integrated fashion with a camera 710 so as to reduce the amount of data that is to be transferred over a network or other connection.

The auxiliary camera 700 is an optional element that may be configured to capture images of the environment in which the display device is present; in practice, this may instead comprise a plurality of cameras that are provided for the same purpose. In some embodiments, these images are captured for display by the display device during the capturing of images of at least a portion of the display device—in other words, images captured of the environment can be used as calibration or reference images for the display modification process. Alternatively, or in addition, the camera 700 may be configured to capture images that can be used to derive one or more properties of the environment (such as ambient brightness) in which the display device is present so as to enable further characterisation of a desired display. For instance, in a brighter environment it may be considered that the desired display has a higher brightness to reduce the effects of glare.

The one or more cameras 710 are operable to capture images of at least a portion of the display device; while in some embodiments a single camera 710 may be considered suitable, in others a plurality of cameras 710 are provided for capturing images of at least a portion of the display device. The images of the at least a portion of the display device may include reference or calibration imagery as appropriate. The one or more cameras 710 may be provided in any suitable configuration—one or more of the cameras 710 may be mounted upon the display device (or otherwise affixed to the display device). Alternatively, or in addition, one or more of the cameras 710 may be otherwise arranged in the environment of the display device so as to capture images of at least a portion of the display.

In the case that more than one camera 710 is provided, it is considered that the plurality of cameras 710 may include one or more cameras that image a different portion of the display device and/or capture images using different parameters to one or more other cameras within that plurality. For instance, an arrangement such as that discussed with reference to FIG. 3 may be provided in which cameras are arranged so as to capture images of different portions of the display device. Alternatively, or in addition, the plurality of cameras 710 may comprise cameras that have different image capture properties such as different colour ranges or sensitivities, different shutter speeds, different shutter types, and/or different frame rates.

The image analysis unit 720 is operable to derive the value of one or more parameters associated with the display of images by the display device in dependence upon the captured images. These parameters are used to characterise the display, and may include one or more of a brightness, contrast, refresh rate, display mode, colour gamut, sharpness, and/or response time of the display. These parameters may be determined for the display as a whole, or for a subset or portion of the display as appropriate. If multiple areas of the display (or a sufficiently large area of the display) are imaged, then it may be possible to identify further parameters such as a brightness uniformity across the display—that is, it may be possible to identify parameters that indicate how the display of content varies across the display device.

The modification determination unit 730 is operable to determine a modification to be applied to a content display process associated with the display device, wherein the modification comprises changes to a content rendering process for generating content to be displayed by the display device and/or one or more display settings associated with the display device.

In some embodiments the modification comprises the initiation or termination of a display mode of the display device, a modification of the brightness of the display device, and/or a modification of the contrast. These are examples of modifications that may be implemented at the display device itself, rather than during the rendering process.

Alternatively, or in addition, the modification may comprise the selection of a particular colour gamut when rendering content to be displayed, a modification of the frame rate of content rendered for display, and/or a modification of the brightness and/or contrast of the content rendered for display. These are examples of modifications that may be implemented by the rendering device, for example by the system itself or by a particular application (such as a video game), or by an intermediate device that is configured to modify rendered images prior to their display.

In some embodiments the modification determination unit 730 is operable to determine the modification in dependence upon the output of a trained machine learning model that is trained to output modifications in dependence upon the value of one or more parameters as derived by the image analysis unit 720. Examples of the implementation of such a model are discussed above, and may include generative adversarial networks or reinforcement learning agents.

The modification communication unit 740 is operable to transmit information identifying the determined modification to one or both of the display device and a processing device operable to render content for display by the display device. This information may comprise an instruction to cause a modification of the operation of one or both of those devices in accordance with the determined modification, or may comprise information that enables such a modification to be implemented. The modification communication unit 740 may be embodied by one or more wired or wireless communication elements in conjunction with processing elements as required for providing this information to the appropriate devices.

The arrangement of FIG. 7 is an example of a processor (for example, a GPU and/or CPU located in a games console, display device, or any other computing device) that is operable to modify the display of content at a display device when used in conjunction with a camera operable to capture images of at least a portion of the display device, and in particular is operable to:

derive the value of one or more parameters associated with the display of images by the display device in dependence upon the captured images;

determine a modification to be applied to a content display process associated with the display device, wherein the modification comprises changes to a content rendering process for generating content to be displayed by the display device and/or one or more display settings associated with the display device; and transmit information identifying the determined modification to one or both of the display device and a processing device operable to render content for display by the display device.

Figure 8:
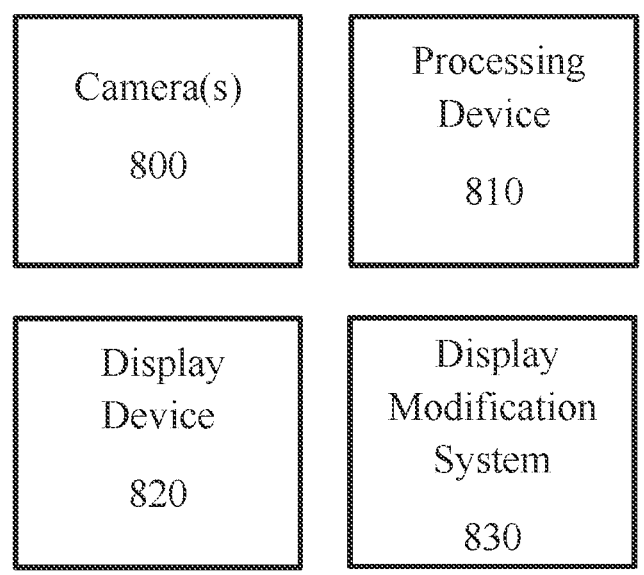
FIG. 8 schematically illustrates a display and display modification system.

FIG. 8 schematically illustrates a system for displaying content to a viewer in accordance with one or more embodiments of the present disclosure. This system comprises one or more cameras 800, a processing device 810, a display device 820, and a display modification device 830.

The one or more cameras 800 correspond to one or both of the cameras 700 and 710 discussed above with reference to FIG. 7.

The processing device 810 is operable to render content for display, subject to any modifications by the display modification system 830. The processing device 810 may be embodied as a games console, laptop, computer, mobile phone, content distribution server, or any other device that renders content for display.

The display device 820 is operable to display the rendered content that is output by the processing device 810, subject to any determined modifications by the display modification system 830. The display device 820 may be provided as any suitable display; examples include televisions, HMDs, laptop or computer monitors, mobile phone or tablet displays, and portable games consoles.

The display modification system 830 is configured to perform the processing function of the processing elements of FIG. 7; that is, the display modification system 830 is configured to determine modifications to be implemented so as to modify the display of content by the display device 820.

While shown as separate units here, it is considered that the functionality of these units may be distributed as desired amongst different devices and/or processing units. For instance, a mobile phone may be utilised as the one or more cameras 800 and the display modification system 830, with a games console and television being the processing device 810 and display device 820 respectively (as discussed above with reference to FIG. 4). Alternatively, each of the features may be implemented in a single device with integrated cameras (such as a mobile phone, laptop, or portable games console). In some embodiments the display modification system 830 may be integrated with one (or each) of the processing device 810 and display device 820 as appropriate.

Figure 9:
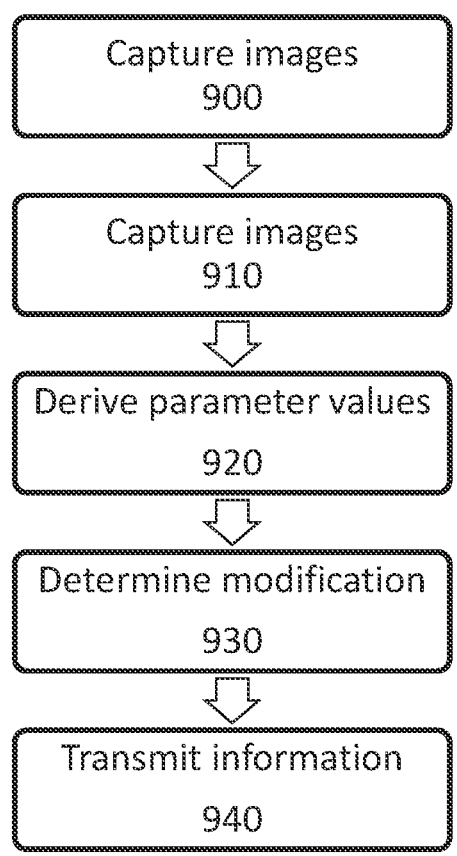
FIG. 9 schematically illustrates a display modification method.

FIG. 9 schematically illustrates a display modification method for use with a display device.

An optional step 900 comprises capturing images of at least a portion of the environment comprising the display device. In some embodiments, these images are captured for display by the display device during the capturing of images of at least a portion of the display device in step 910 described below. Alternatively, or in addition, images may be captured that can be used to derive one or more properties of the environment (such as ambient brightness) in which the display device is present so as to enable further characterisation of a desired display.

A step 910 comprises capturing images of at least a portion of the display device using a camera; the display device may be controlled to provide one or more calibration or references images (or sets of images). In some embodiments, images captured in the optional step 900 may be displayed during this step.

A step 920 comprises deriving the value of one or more parameters associated with the display of images by the display device in dependence upon the captured images.

A step 930 comprises determining a modification to be applied to a content display process associated with the display device, wherein the modification comprises changes to a content rendering process for generating content to be displayed by the display device and/or one or more display settings associated with the display device.

A step 940 comprises transmitting information identifying the determined modification to one or both of the display device and a processing device operable to render content for display by the display device.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A display modification system for use with a display device, the system comprising:

a camera operable to capture images of at least a portion of the display device;

an image analysis unit operable to derive the value of one or more parameters associated with the display of images by the display device in dependence upon the captured images;

a modification determination unit operable to determine a modification to be applied to a content display process associated with the display device, wherein the modification comprises changes to a content rendering process for generating content to be displayed by the display device and/or one or more display settings associated with the display device; and a modification communication unit operable to transmit information identifying the determined modification to one or both of the display device and a processing device operable to render content for display by the display device.

2. A system according to clause 1, wherein the images of the at least a portion of the display device include reference or calibration imagery.

3. A system according to any preceding clause, wherein the camera is mounted upon the display device.

4. A system according to any preceding clause, wherein a plurality of cameras are provided for capturing images of at least a portion of the display device.

5. A system according to clause 4, wherein the plurality of cameras includes one or more cameras that image a different portion of the display device and/or capture images using different parameters to one or more other cameras within that plurality.

6. A system according to any preceding clause, wherein the parameters include one or more of a brightness, contrast, refresh rate, display mode, colour gamut, sharpness, and response time of the display.

7. A system according to any preceding clause, wherein the modification comprises the initiation or termination of a display mode of the display device, a modification of the brightness of the display device, and/or a modification of the contrast.

8. A system according to any preceding clause, wherein the modification comprises the selection of a particular colour gamut when rendering content to be displayed, a modification of the frame rate of content rendered for display, and/or a modification of the brightness and/or contrast of the content rendered for display.

9. A system according to any preceding clause, wherein the modification determination unit is operable to determine the modification in dependence upon the output of a trained machine learning model that is trained to output modifications in dependence upon the value of one or more parameters as derived by the image analysis unit.

10. A system according to any preceding clause, comprising an auxiliary camera that is configured to capture images of the environment for display by the display device during the capturing of images of at least a portion of the display device.

11. A system for displaying content to a viewer, the system comprising:
a processing device operable to render content for display;
a display device operable to display the rendered content; and
the display modification system of any of the preceding clauses.

12. A system according to clause 11, wherein the display device is a head-mountable display device.

13. A display modification method for use with a display device, the method comprising:
capturing images of at least a portion of the display device using a camera;
deriving the value of one or more parameters associated with the display of images by the display device in dependence upon the captured images;
determining a modification to be applied to a content display process associated with the display device, wherein the modification comprises changes to a content rendering process for generating content to be displayed by the display device and/or one or more display settings associated with the display device; and
transmitting information identifying the determined modification to one or both of the display device and a processing device operable to render content for display by the display device.

14. Computer software which, when executed by a computer, causes the computer to carry out the method of clause 13.

15. A non-transitory machine-readable storage medium which stores computer software according to clause 14.

The invention claimed is:

1. A display modification system for use with a display device, the system comprising:
a camera operable to capture images of at least a portion of the display device;
an image analysis unit operable to derive the value of one or more parameters associated with the display of images by the display device in dependence upon the captured images;
a modification determination unit operable to determine a modification to be applied to a content display process associated with the display device, wherein the modification comprises changes to a content rendering process for generating content to be displayed by the display device; and
a modification communication unit operable to transmit information identifying the determined modification to a processing device operable to render content for display by the display device.

2. The system of claim 1, wherein the images of the at least a portion of the display device include reference or calibration imagery.

3. The system of claim 1, wherein the camera is mounted upon the display device.

4. The system of claim 1, wherein a plurality of cameras are provided for capturing images of at least a portion of the display device.

5. The system of claim 4, wherein the plurality of cameras includes one or more cameras that image a different portion of the display device and/or capture images using different parameters to one or more other cameras within that plurality.

6. The system of claim 1, wherein the parameters include one or more of a brightness, contrast, refresh rate, display mode, colour gamut, sharpness, and response time of the display.

7. The system of claim 1, wherein the modification comprises the selection of a particular colour gamut when rendering content to be displayed, a modification of the frame rate of content rendered for display, and/or a modification of the brightness and/or contrast of the content rendered for display.

8. The system of claim 1, wherein the modification determination unit is operable to determine the modification in dependence upon the output of a trained machine learning model that is trained to output modifications in dependence upon the value of one or more parameters as derived by the image analysis unit.

9. The system of claim 1, comprising an auxiliary camera that is configured to capture images of the environment for display by the display device during the capturing of images of at least a portion of the display device.

10. The system of claim 1, further comprising:
the processing device operable to render content for display; and the display device operable to display the rendered content.

11. The system of claim 10, wherein the display device is a head-mountable display device.

12. A display modification method for use with a display device, the method comprising:
- capturing images of at least a portion of the display device using a camera;
- deriving the value of one or more parameters associated with the display of images by the display device in dependence upon the captured images;
- determining a modification to be applied to a content display process associated with the display device, wherein the modification comprises changes to a content rendering process for generating content to be displayed by the display device; and
- transmitting information identifying the determined modification to a processing device operable to render content for display by the display device.

13. A non-transitory machine-readable storage medium which stores computer software which, when executed by a computer, causes the computer to perform a method for use with a display device, the method comprising:
- capturing images of at least a portion of the display device using a camera;
- deriving the value of one or more parameters associated with the display of images by the display device in dependence upon the captured images;
- determining a modification to be applied to a content display process associated with the display device, wherein the modification comprises changes to a content rendering process for generating content to be displayed by the display device; and
- transmitting information identifying the determined modification to a processing device operable to render content for display by the display device.

* * * * *